March 20, 1945.  W. F. GERHARDT  2,371,687
AIR VEHICLE
Filed Feb. 4, 1942  3 Sheets-Sheet 1
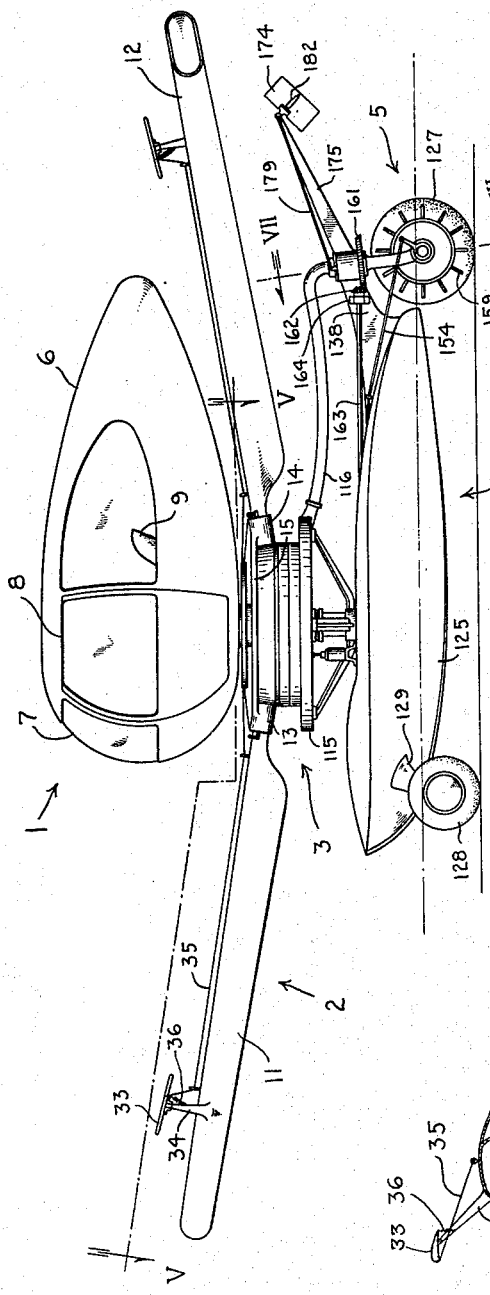
INVENTOR
WILLIAM F. GERHARDT
BY Raymond F. Demes
ATTORNEY

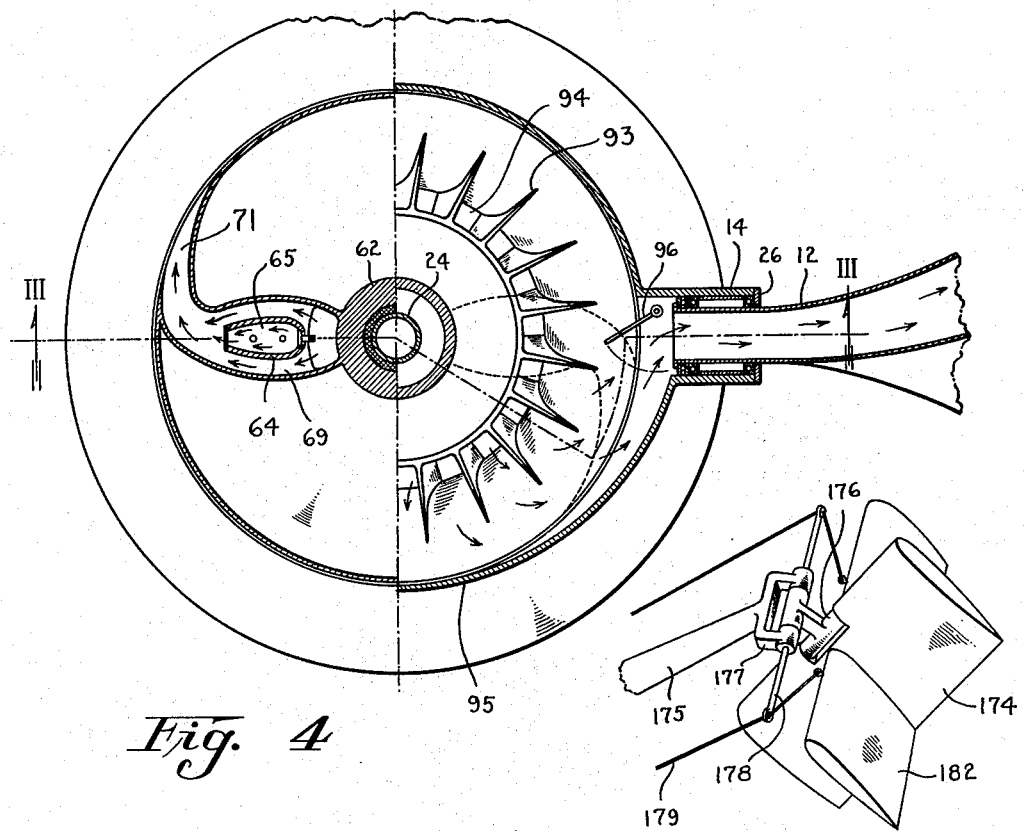
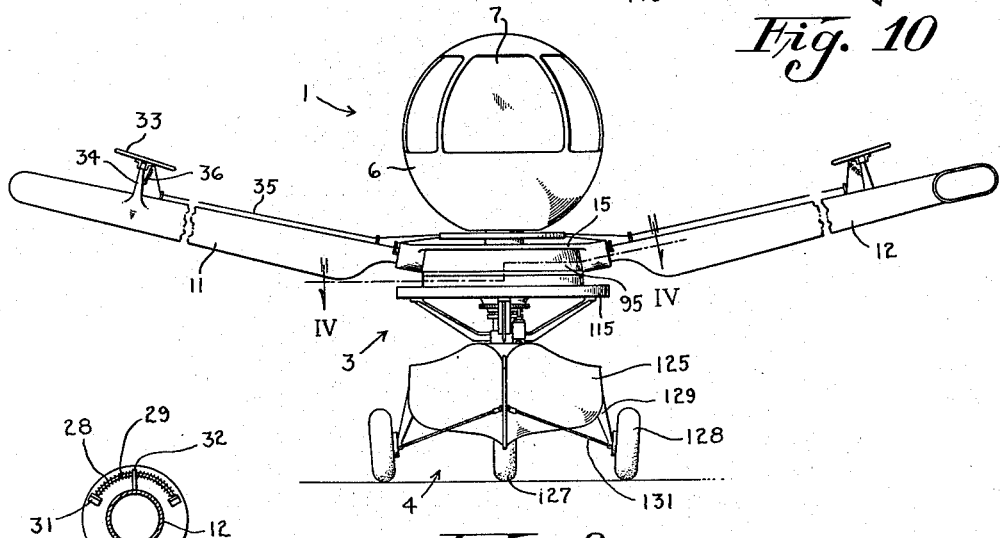

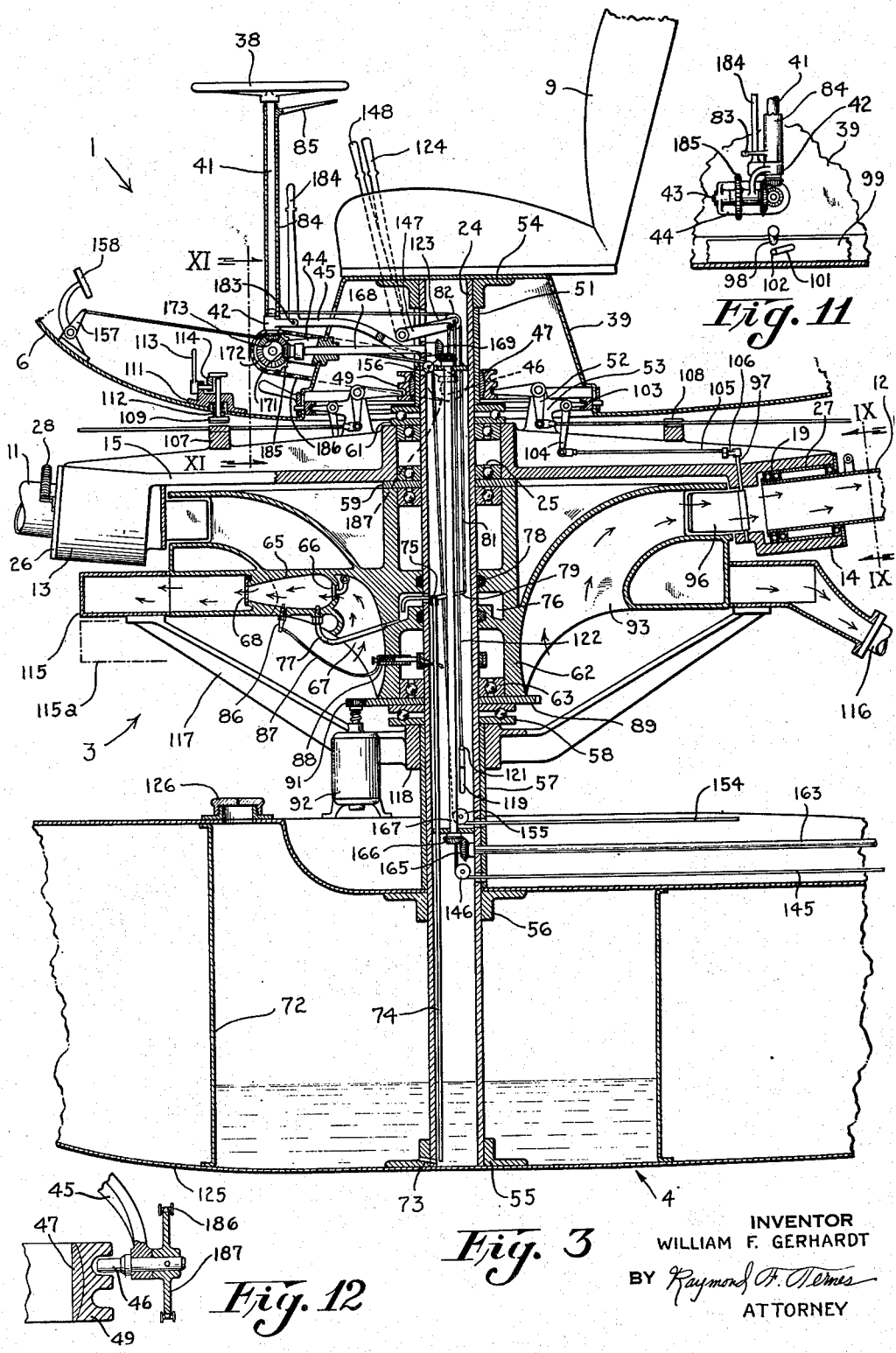

Patented Mar. 20, 1945

2,371,687

UNITED STATES PATENT OFFICE 2,371,687

AIR VEHICLE

William F. Gerhardt, Detroit, Mich.

Application February 4, 1942, Serial No. 429,491

4 Claims. (Cl. 244—17)

This invention relates to aerial vehicles and in particular it relates to aerial vehicles of the helicopter type. More particularly the invention relates to such a vehicle having the versatile function of including a self-propelling drive on land and on the water.

Briefly, the invention comprises an aerial vehicle of the helicopter type in which the blades are rotated by jet propulsion, the force being obtained from a blower driven by a prime mover, as a gas turbine; such a unit being capable of operation in the air, on land and on water by suitable manipulation of controls conveniently located within a cockpit.

Among the objects and advantages of my invention are to provide an aerial vehicle of the helicopter type including aerodynamic torque means in the form of a rudder positioned in relation to the vertical lift screw propeller to provide means automatically responsive to changes in the relative wind for swinging the rudder about a first axis, and means for manually operating the rudder about a second axis transverse to said first axis. These and other objects and advantages will appear more fully in the following detailed description when considered in connection with the accompanying drawings, in which:

Figure 1 is a side elevation view of an aerial vehicle embodying my invention;

Figure 2 is a front elevational view thereof;

Figure 3 is an enlarged elevational view in section taken through the central body of the vehicle, and particularly as indicated by the section lines III—III of Figure 4;

Figure 4 is a plan view of a power and blower unit, partly in section, taken along lines IV—IV of Figure 2;

Figure 5 is a plan view, partly in section, of an air screw taken along lines V—V of Figure 1;

Figure 6 is a transverse view, in section, of an air screw taken along lines VI—VI of Figure 5;

Figure 7 is a transverse view of a tail wheel taken along lines VII—VII of Figure 1;

Figure 8 is a side elevational view, partly in section, of the tail wheel as shown in Figure 7;

Figure 9 is a transverse view, in section, taken near the hub of the air screw along lines IX—IX of Figure 3;

Figure 10 is a perspective view of a rudder assembly;

Figure 11 is a view, partly in section, of control mechanism taken along lines XI—XI of Figure 3; and, Figure 12 is a detail view, in section, of a hub member for operating auxiliary control wings.

Referring to the drawings, and in particular to Figure 1, the aerial vehicle of my invention may be divided into several units comprising essentially a cockpit 1, air screw 2, power and blower unit 3, float 4 and tail wheel assembly 5. The cockpit 1 comprises a streamline housing or cabin 6 provided with windows 7, a door 8 and enclosing a pilot's seat 9. All of the controls for operating the aerial vehicle are located within the cabin 6 readily accessible to a pilot supported by the seat 9.

The air screw 2 is formed of two blades 11 and 12, it being understood that three or four blades may be provided if desired. The blades 11 and 12 are retained by hubs 13 and 14, respectively, forming a part of an annular member 15 freely rotatable upon a vertical tubular member, hereinafter described.

As shown in Figures 5 and 6, each of the air screw blades 11 and 12 includes a wing surface which presents a streamline contour in cross section. The air screws contain a longitudinal extending partition 16 forming a passageway 17 extending from the stem of the air screw blade and extending to an opening 18 at the trailing end of the air screw at which point the wing section flares outwardly as shown in Figure 6. The stems of the air screws, as shown in Figure 3, extend within the hubs 13 and 14 and are retained therein by roller and thrust bearings 19 which allow rotational movement of the air screws about their own axes but retain the screws from outward movement. The action of these screws or blades in rotation is much like the action of the autogyro in that they are free to follow the line of the combined reaction of centrifugal force and thrust. Thus, except for local bending the only necessity for strength is to withstand the centrifugal force.

As shown in particular in Figure 3, the blades 11 and 12 are supported by hubs 13 and 14 respectively forming a part of an annular bracket 15 freely rotatable about a vertical tubular column 24. Ball bearings 25 interposed between the annular member 15 and tubular column 24 facilitates the free rotary movement of the bracket. A plate 26 secured to the outer end of each of the hubs 13 and 14, in cooperation with spacer sleeves 27 and bearings 19, retain the stem portions of the blades 11 and 12 in relative association with the hubs 13 and 14 while permitting free rotational movement of the blades about their own axes. The blades, however, are restricted in their permissible rotation about their own axes by springs 28 (Fig. 9) operating upon an arcuate guide rod 29 supported by brackets 31 attached to the retaining plate 26. A projecting arm 32 extending from the stem of the air screw blades engages with the springs 28 to maintain the blades in their normal or equilibrium position.

Near the tips of each of the blades 11 and 12 is located an auxiliary aerodynamic control wing 33, as shown in Figures 5 and 6. This wing is spaced from the air screw blade by a strut 34 at the end of which the wing is hinged and is controlled by a cable 35 operating against the action of a spring 36. These auxiliary control wings, as appear in Figure 1, are given a dihedral with respect to the horizontal for purposes of stability. The cable 35 connects with the outer tip of wing 33, passes through a guide eye 37, extends parallel with the air screw blades and engages with central controls hereinafter described.

The auxiliary control wings 33 are actuated from the cockpit through a stick or steering wheel 38 located in front of the pilot seat 9 which is supported from the floor of the cabin 6 by a frustro-conical shaped extension 39 of the housing. The steering wheel 38 is keyed to a shaft 41, the lower end of the shaft being mounted in a bearing bracket 42 which in turn is pivoted to a horizontal axle 43 (Fig. 11) extending from a bracket 44 attached to the housing extension 39.

By this arrangement the wheel 38 (Fig. 3) is pivoted at its lower extremity so that it may be moved toward or away from the pilot's seat, or laterally of the pilot's seat, such as the movements of a conventional airplane stick. This movement is utilized for actuating the auxiliary wings 33. To accomplish this a bifurcated arm 45 pivotally attached at 183 to the bearing 42 and provided with travelers 46 engages with a groove in a hub member 49 freely slidable on a spherical bushing 47 which in turn is vertically slidable on a spacer sleeve 51 positioned outside of the vertical column 24. By this connection, movement of the stick 41 in a lateral direction tilts the hub member laterally on the spherical bushing 47. To transmit this movement from the relatively stationary cockpit to the auxiliary wings 33, a pair of bellcrank arms 52 is provided. These bellcrank arms are mounted on brackets 53 extending from the annular member 15. One end of each bellcrank arm engages a second groove in the hub 49 while the opposite end of each bellcrank arm connects with the cable 35 leading to the auxiliary wings 33.

A lever 184 forming a vertical extension of the bifurcated arm 45 provides manual means for elevating or lowering the hub member 48, thus forming an independent control for adjusting the auxiliary wings 33.

Forward movement of the vehicle is attained by moving the stick 41 in a forward direction. To obtain this function a sprocket 185 is attached to the bracket 42, and through a chain 186 communicates with a sprocket 187 pinned to the traveller 46 (Fig. 12). Therefore, forward movement of the stick tilts the hub member 49 in the plane of the longitudinal axis of the vehicle. This movement of the hub operates the auxiliary wings 33 to cause the fore and aft wings to incline in opposite directions, thus tilting the vertical axis of the vehicle and moving the vehicle in a forward direction.

As appearing in Fig. 3, the vertical column 24 provides the main structural element which connects the principal units of the air vehicle together. The upper end of the vertical column 24 is attached to a flange 54 secured to the extension member 39 of the housing 6. The lower end of the vertical column 24 is attached to flanges 55 and 56 secured to the float 4. Intermediate the cockpit and the float is the power unit 3 and the air screw blade supporting annular member 15, both of these units being rotatable about the vertical column 24. The power unit is held in spaced relationship with the float by means of a spacer sleeve 57 which extends from the float 4 to a thrust bearing 58 which supports the load of the power unit 3. A spacer washer 59 separates the power unit 3 from the annular member 15, and the vertical lift load of the air screw blades is carried by a thrust bearing 61 mounted between the annular member 15 and the spacer sleeve 51, the upper end of which bears against the flange 54 supporting the cockpit.

The power unit comprises essentially a rotor frame 62 as shown particularly in Figures 3 and 4. This unit consists in general of a gas turbine in combination with a blower. The gas turbine provides the means of propelling the rotor 62 which in turn functions as a blower through which air is forced through the air screw blades and ejected at the trailing tip ends of the blade thus providing a jet propulsion for rotating the blades in a horizontal plane. The rotor frame 62 is supported by the vertical column 24 through ball bearings 63. Located within the rotor frame 62 is a direct burning jet 64 which provides a combustion chamber 65. This chamber is preferably lined with a refractory material, such as carborundum, to withstand the high temperatures of combustion. The inner mouth of the combustion chamber is provided with a check valve 66 which opens into an air inlet passage 67 while the outer mouth of the combustion chamber is provided with a flap valve 68. By-pass chambers 69 are provided on each side of the jet burner 64 and these by-passage ways converge to form a single passageway 71 positioned so as to extend at the outer periphery of the rotor in a position substantially tangent to the rotor. By this construction the gases are ejected from the rotor in a manner to cause rotation of the power unit. When the jet is discharged the by-passage ways thus provided act as a thrust augmentor to draw large quantities of air from the intake manifold which cuts down the speed of the jet in the passage-way 71 and decreases the kinetic energy loss at any given speed of rotation of the rotor as compared with the straight jet operation. In addition the by-pass chambers 69 function to cool the jet 64. Also, the high velocity of the air as it flows into the intake manifold 67 by means of the inspirator action produces a velocity head of several atmospheres sufficient to obtain high efficiency of the combustion. This action supplements the pressure obtained at this point by means of the centrifugal force acting on the air column which in itself is hardly sufficient to obtain high efficiency.

Two complete combustion units are employed in diametrically opposed positions.

Fuel for the combustion chamber 65 is drawn from a fuel tank 72 forming a part of the float 4. An aperture 73 extending through the flange 55 and through the vertical column 24 permits the fuel to enter the interior of the tubular column 24. A conduit 74 within the tubular column extends to a point near the bottom of the fuel tank through a valve 75 and ending at a well 76 formed in the rotor frame 62. A continuation conduit 77 connects the well 76 with the combustion chamber 65. The well 76 forms a chamber, and packing 78 seals the chamber with the vertical column 24. As the power unit is initially rotated by means hereinafter described a suction is formed in the combustion chamber and in the well 76 which draws the fuel up the conduit 74 and into the well 76. From this point the fuel is carried out by suction and by centrifugal force to the combustion chamber 65.

Manual means are provided for controlling the fuel valve 75. This means includes a valve arm 79 and a cable 81 attached thereto and extending around a sheave 82 supported by the vertical column 24. The cable 81 attaches to an arm 83 (Fig. 11) extending from a sleeve 84 positioned around the steering shaft 41. A hand control lever 85 also extending from the sleeve 84 provides manual means for actuating the fuel valve.

Ignition means in the form of a spark plug 86 is associated with the combustion chamber 65 for the purpose of initiating combustion. An electrical wire 87 connects the spark plug 86 with an insulated sleeve and brush contact mechanism 88 through which electrical energy may be transferred through the stationary vertical column 24 to the rotating terminal mechanism. The electrical wires leading to the brush mechanism 88 may be connected to any conventional means (not shown) for supplying electrical energy. After the gas turbine is once set in operation continuation of the ignition system is not usually necessary.

In order to initiate rotation of the power unit conventional combustion engine starting means may be employed. For this purpose a ring gear 89 secured to the base of the rotor frame 62 meshes with a drive gear 91 driven by a motor 92 supported by the float 4. The relationship of the drive gear 91 and ring gear 89 is such that the gears become aligned only when energy is supplied to the motor 92. As soon as the power unit begins to rotate by its own force the gear 89 throws the drive gear 91 into a disengaging position.

Associated with the gas turbine is an aerodynamic transmission in the form of a blower or centrifugal pump. This includes a plurality of blades 93 forming a part of the rotor frame 62. These blades together with the rotor frame form a plurality of passageways 94 which upon rotation of the power unit draws air from the lower central portion of the rotor at which point the passageways 94 are open to the atmosphere and throws the air at high velocity toward the outer periphery of the blower. Surrounding the outer periphery of the blower is an enclosure 95 which extends downwardly from the annular member 15. This enclosure functions to collect the air generated by the blower and direct the air to the air screw blades as shown by the indicating flow line arrows in Figures 3 and 4. The enclosure 95 while confining the air generated by the blower does not contact with the blower or the rotor frame 62 so that the relative rotary movement of the annular member 15 and the rotor frame 62 remain independent.

To facilitate the movement of air from the blower through the air screw blades, a shutter valve 96 is provided. This shutter valve is attached to a shaft 97 mounted in each hub member 13 and 14 in a manner so that when the shutter is in closed position air from the blower is prevented from moving through the air screw blades. This requirement is necessary in order to prevent rotation of the air screw blades when it is desired to maintain them in an inoperative position while the power unit is in operation.

The shutter valve 96 is operated from the cockpit through the actuation of a hand lever 98 (Figs. 3 and 11). The hand lever 98 is attached to a ring or band 99 extending loosely around the base portion of the housing extension 39. A plurality of diagonally disposed slots 101 are formed in the band 99 into which a pin 102 extends from a grooved ring located inside of the housing extension 39. Actuation of the hand lever 98 causes a circumferential movement of the band 99, which, through the slots 101 and pins 102, causes a vertical movement of the ring 103. A bell crank arm 104 pivoted to the bracket 53 has one of its arms extending into the groove of the ring 103. The opposite end of the bell crank arm engages with a connecting link 105 which joins the shaft 97 through a connecting arm 106. By this arrangement circumferential movement of the band 99 by the hand lever 98 is converted into a vertical movement of the ring 103 which in turn operates the shutter valve 96. The grooved ring 103 provides an association with the bell crank 104 which permits the relative movement, as described, to function notwithstanding the relative movement between the cockpit and the rotating annular member 15 which supports the shutter 96.

Means are also provided to lock the air screw in any desired position when it is not intended that it should rotate. This is accomplished by a brake ring 107 forming a part of the annular member 15. Slots 108 are provided in this brake ring to provide clearance for the auxiliary wing control cables 35. In cooperative position with the brake ring 107 is a brake plunger 109 vertically movable in a bracket 111 attached to the cockpit housing 6. A spring 112 functions with the brake plunger 109 tending to engage the latter with the brake ring 107 thus locking the brake ring with the cockpit housing 6 and preventing rotation of the air screw blades. The brake plunger 109 may be moved out of engagement with the brake ring 107 by means of a hand lever 113 associated with a cam 114 engageable with the upper portion of the brake plunger 109.

One of the features of my invention is the provision of means for driving the vehicle while it is on the ground and on the water. A turbine drive wheel hereinafter described is utilized for this purpose. Power to drive the turbine wheel is obtained from the exhaust gases of the gas turbine power unit. A receiving manifold 115 (Fig. 3) is adaptable for alignment with the gas turbine discharge passageway 71 and for collecting the gases and forcing them through a flexible conduit 116 leading to the turbine wheel. The receiving manifold 115 is positioned by brackets 117 joining a central hub 118 which is vertically slidable on the spacer sleeve 57. As shown in Figure 3, the receiving manifold 115 is illustrated in aligned position with the discharge end of the gas turbine. The receiving manifold may be lowered into the position 115—A as shown by the dot and dash lines, thus being entirely in inoperative position with respect to the gas turbine. In order to elevate and lower the receiving manifold 115 a slot 119 is formed through the vertical column 24 and through the spacer sleeve 57. Through this slot a pin 121 engages with a rod 122. The rod in turn is attached to an arm 123 pivotally supported by the housing extension 39, and a hand lever 124 forming a continuation of the arm 123 provides manual means for controlling the elevation of the receiving manifold 115.

The float 4 supports the vehicle on water and consists essentially of a pontoon or boat shell 125 which is the basis for supporting the main structure and the vertical column 24. As hereinbefore stated, a portion of the unit forming the float 4 is partitioned to function as a fuel reservoir for the gas turbine. A filler cap and fitting 126 (Fig. 3) located on top of the pontoon 125 serves as an inlet to the fuel tank. The pontoon 125 includes amphibian features by supporting a tail wheel 127 (Fig. 2), and a pair of forward wheels 128. The forward wheels are supported by a strut 129, extending from the pontoon 125, and a brace 131.

The tail wheel 127 is mounted on a rim 132 (Fig. 7) which includes an air turbine 133 and a brake drum 134. These elements are also associated with a hub 135 supported by a bifurcated arm 136 pivoted vertically in a hub 137 forming a part of a tail member 138 (Fig. 1) extending from the aft end of the pontoon 125. The spindle 139 of the bifurcated arm 136 (Fig. 7) is hollow and is adapted to engage with the conduit 116 leading to the receiving manifold 115. A short length of conduit 141 (Fig. 8) extends from the opposite end of the spindle 139 and flares outwardly as it engages the air turbine 133. A shutter valve 142 is positioned within the flared out portion of the conduit 141 so that upon actuation of the shutter valve the direction of flow of gases as it enters the turbine may be changed to accommodate a forward or reverse rotation of the tail wheel 127. A lever 143 operates the shutter 142 and is held in its normal forward position by means of a spring 144. Attached to the lever 143 is a cable 145 which, as shown in Figure 3, leads to a cockpit control. This cable 145 passes around a pulley 146 located within the vertical column 24. The upper end of the cable connects with an arm 147 pivotally supported by the housing extension 39, and a hand lever 148 joining the arm 147 provides manual means for controlling the forward or reverse movement of the tail wheel 127.

As shown in Figure 7, a conventional brake band mechanism 149 is located within the brake drum 134 and is operable by a sleeve 151 rotatably mounted on a wheel axle 152. This sleeve 151 includes conventional cam means for operating the brake band and includes an operating lever 153. A cable 154 (Figs. 1 and 3) extends around a pair of pulleys 155 and 156 located within the vertical column 24. The cable 154 extends to a lever 157 pivotally supported by the housing 6 and operable by a foot pedal 158.

The exhaust gases from the gas turbine act upon the turbine 133 to cause the vehicle to move along in either a forward or reverse direction. By the same power means, the vehicle is caused to be navigated in water. To facilitate this function a plurality of blades or paddles 159 (Fig. 7) extend radially from the brake drum 134.

Steering of the vehicle on either land or water is accomplished by pivotal movement of the tail wheel 127. A bevel gear 161 is keyed to the spindle 139 and, as shown in Fig. 1, meshes with a complementary bevel gear 162. A shaft 163 is keyed to the bevel gear 162 and the shaft is supported by a bearing 164 secured to the extension member 138. A mitre gear 165 (Fig. 3) is keyed to the opposite end of the horizontal shaft 163. This gear meshes wtih a complementary mitre gear 166 keyed to a vertical shaft 167 within the vertical column 24. At the upper end of the vertical shaft 167 the shaft is coupled to a short horizontal shaft 168 through a pair of mitre gears 169. The opposite end of the shaft 168 is also provided with a bevel gear 171 which meshes with an intermediate gear 172 supported by the bracket 44. Also meshing with the gear 172 is a bevel gear 173 keyed to the lower end of the steering shaft 41. By this arrangement of gears and shafts rotary movement of the steering wheel 38 imparts steering movement to the tail wheel 127.

In order to prevent a tendency of the cockpit to rotate with the power plant due to the friction of the bearings, a torque control is provided. This consists essentially of a rudder 174 (Fig. 10) positioned by a bracket member 175 which extends rearwardly from the tail wheel supporting hub 137 (Fig. 1). The rudder 174 is pivotally connected to a bracket 176 and the bracket in turn is pivotally connected, but in a transverse direction relative thereto, to a yoke 177 forming the end of the bracket member 175. An axle 178 forming the pivot for the yoke 177 and the bracket 176 serves at its outer ends for guides through which a pair of cables 179 extend. These cables are attached at one end to a pair of arms 181 (Fig. 7) attached to the spindles 139. Thus the control of the rudder 174 is actuated at the same time and by the same means as is utilized to control the movement of the tail wheel 127. The opposite end of the cables 179 are attached to the leading edges to a pair of wing foils 182 extending transversely and centrally of the rudder 174. This pair of wing foils function with the double pivoted connection associated with the rudder 174 to maintain the rudder in a headed position relative to the resultant slip stream produced by the vehicle in flight.

In the operation of the vehicle, the pilot starts the motor by engaging the ignition system and by conventional controls (not shown) causing the starting motor 92 to rotate. This action provides a sufficient amount of suction to draw fuel from the fuel tank into the well 76 from which it enters the combustion chamber 65. Combustion of the gases is started by means of the spark plug 86. After the chamber has been sufficiently warmed by this initial burning the ignition system may be disengaged. Thereafter the gasoline throttle 85 may be adjusted to provide the desired motor speed. During the neutral operation of the motor the receiving manifold 115 (Fig. 3) is also in its neutral position as shown by the position 115—A.

While the air vehicle is resting upon the ground the shutter valves 96 are in their closed position so as to prevent the air forced from the blower from entering the passageway within the air screw. As an additional precaution against rotation of the vehicle the brake plunger 109 is engaged with the brake ring 107.

To take off from the ground the pilot actuates the brake lever 113 so as to raise the brake plunger 109 from the brake ring 107 and opens the shutter valves 96 to the position as shown in Figure 3. Operation of the shutter valves is controlled by operation of the hand lever 98 located near the floor of the cockpit. The air screw now begins to revolve by jet propulsion.

By means of the auxiliary wings 33 located near the ends of the air screw blades and operated by movement of the stick 41 or lever 184, the pilot keeps the angle of incidence of the blades very low in order that the screw reaches take off speed quickly. By movement of the lever 184 in a forward direction the vehicle may be made to leave the ground. The longitudinal movement of the lever 184 varies the position of the auxiliary wings and by this control the pitch of the blades may be varied to obtain the desired rate of climb. It will usually be found that one blade will lift higher than the other and produce an uabalance as it is not possible to position the blades exactly alike. In this case, before the vehicle lifts off the ground, the pilot adjusts the stick laterally so as to tilt the grooved hub member 49, thus obtaining a variance in the position of the auxiliary wings 33 on the different blades until the blades lift equally. When satisfactory balance is accomplished the pitch is further increased and the vehicle ascends.

To pitch or bank or rotate about any horizontal axis of the vehicle the pilot simply moves the stick 41 in the direction he wishes the vehicle in a tilting or direct vertical movement of the grooved hub 49. When the hub is tilted a corresponding motion is transmitted to the auxiliary wings. As one of the auxiliary wings is actuated the reverse action takes place respecting the auxiliary wing on the opposite blade. As the blades are free to rotate within limits about their own axis the angle of incidence is decreased on the side toward which the stick is moved and increased on the other. Thus, a differential thrust movement is produced which tilts the vehicle producing a thrust component and the vehicle side-slips in the direction desired.

As soon as horizontal motion is obtained another change in thrust distribution results from the horizontal motion. On one side a blade is advancing forward with its peripheral speed so as to increase its effective speed in relation to the wind; on the other side it is retreating so as to decrease the relative speed. On account of the properties of constant incidence of the system, the angle of attack will remain in constant on the side quadrants; hence the total thrust would be greater on the side of the advancing blade than of the retreating blade, and a moment tending to bank the vehicle will be introduced. This may be counterbalanced by controlling the angle of attack by moving the stick forward and laterally to cause a decrease of angle of attack on the advancing blade and an increase on the retreating blade.

To turn the vehicle the pilot merely moves the stick to the side he wishes to turn thereby securing a bank, then pulls back on the stick to secure the reaction to the centrifugal force. Simultaneously the stick is moved to give the necessary turning to the central nacelle. In essence this is similar to the conventional airplane turn except that more right stick is carried to take care of the differential thrust distribution due to forward speed.

The rudder 114 functions as a torque means to prevent the cockpit and chassis from rotating with the motor due to the friction of the bearings. In order to take care of all directions of the slip stream through 180 degrees the whole rudder assembly is free to pivot about its hinged support so as to head into the resultant stream by the auxiliary lateral wings 182. Manual movement of the rudder is obtained by rotary movement of the steering wheel 38.

For landing, the pilot has two options. If the power plant is working then the pilot simply throttles the motor and comes down slowly to the ground. If the motor is not working the pilot allows the machine to glide down at its minimum rate of descent. On nearing the ground the pilot moves the stick to increase the pitch of the screw blades to obtain maximum lift.

To operate the vehicle on land the pilot closes the shutter valves 95 and engages the brake plunger 109 so that the screw blades will remain inactive. Thereafter, the hand lever 124 is actuated which elevates the receiving manifold 115 into aligned position with the discharge end of the combustion chambers. The resulting force assisted by the blowerlike by-pass adjacent to the combustion chamber produces a pressure which moves through the conduit 116, and, as shown in Figure 8, engages the wheel turbine 133 to cause the wheel to rotate. Steering is accomplished by the hand wheel 38 which engages the tail wheel 127 by a direct gear drive. To reverse the vehicle the valve 142 (Fig. 8) is actuated by the cockpit control 148 to change the direction of flow of air against the wheel turbine.

For operating the vehicle in water the same functional operations are produced, facilitated by paddle blades 159 forming a part of the tail wheel assembly.

When operating as a land vehicle the foot brake pedal 158 in the cockpit serves in a conventional manner to brake the tail wheel.

From the foregoing it is believed apparent that I have provided a novel combination of elements functionally interrelated to produce a safe vehicle of practical use in the air, on land and on the water, and while I have shown and described a preferred embodiment of my invention it is to be understood that it is susceptible of those modifications which appear within the spirit of the invention and the scope of the appended claims.

Having thus described my invention what I claim and desire to protect by Letters Patent is:

1. In a helicopter, the combination with a body, landing chassis and vertical lift screw propeller, of aerodynamic torque means, said means comprising a rudder, means for manually operating the rudder, and automatic means for maintaining the leading edge of the rudder substantially normal to the direction of the relative wind.

2. In a helicopter, the combination with a body, landing chassis and vertical lift screw propeller, of aerodynamic torque means positioned within the slip stream of the vertical screw propeller, said means comprising a rudder, means for manually operating the rudder, and automatic means for maintaining the leading edge of the rudder substantially normal to the direction of the relative wind.

3. In a helicopter, the combination with a body, landing chassis and vertical lift screw propeller, of aerodynamic torque means positioned within the slip stream of the vertical screw propeller, said means comprising a rudder pivoted to the chassis to permit change of position of the leading edge of the rudder with change of the relative wind, and auxiliary wings extending laterally from the rudder for maintaining the leading edge of the rudder substantially normal to the direction of the relative wind.

4. In a helicopter, the combination with a body, landing chassis and vertical lift screw propeller, of aerodynamic torque means, said means comprising a rudder, a universal pivot connecting the rudder with the chassis, aerodynamic means automatically responsive to changes in the relative wind for swinging the rudder about a first axis, and means for manually operating the rudder about a second axis transverse to said first axis.

WILLIAM F. GERHARDT.